(12) United States Patent
Moje et al.

(10) Patent No.: US 9,809,325 B2
(45) Date of Patent: Nov. 7, 2017

(54) AIRCRAFT SYSTEM COMPONENT CARRIER SYSTEM AND MOUNTING METHOD

(71) Applicant: AIRBUS OPERATIONS GMBH, Hamburg (DE)

(72) Inventors: Sabrina Moje, Hamburg (DE); Dirk Humfeldt, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 497 days.

(21) Appl. No.: 13/922,057

(22) Filed: Jun. 19, 2013

(65) Prior Publication Data
US 2013/0277901 A1 Oct. 24, 2013

Related U.S. Application Data

(63) Continuation of application No. PCT/EP2011/006443, filed on Dec. 20, 2011.
(Continued)

(30) Foreign Application Priority Data

Dec. 23, 2010 (DE) .......................... 10 2010 055 962
Dec. 23, 2010 (DE) .......................... 10 2010 055 995

(51) Int. Cl.
*B64F 5/00* (2017.01)
*B64C 1/06* (2006.01)
(Continued)

(52) U.S. Cl.
CPC .............. *B64F 5/0009* (2013.01); *B64C 1/06* (2013.01); *B64C 1/068* (2013.01); *B64D 11/00* (2013.01);
(Continued)

(58) Field of Classification Search
CPC .... B64C 1/068; B64C 1/039; B64C 1/06; B64C 1/1069; B64D 11/003; B64F 5/009; B64F 5/0009
(Continued)

(56) References Cited

U.S. PATENT DOCUMENTS 4,621,780 A * 11/1986 Doyhamboure .......... B64C 1/22
  105/396
4,648,570 A *  3/1987 Abdelmaseh ............. B64C 1/22
  244/117 R
(Continued)

FOREIGN PATENT DOCUMENTS

DE       198 39 701       3/2000
DE   10 2007 050 422       4/2009
(Continued)

*Primary Examiner* — Blair M Johnson
(74) *Attorney, Agent, or Firm* — Dickinson Wright (57) ABSTRACT

An aircraft system component carrier system includes at least one aircraft system component carrier module, at least one aircraft system component that is fastened via an aircraft system component holder to the aircraft system component carrier module, and an aircraft structural element of a fuselage upper shell, to which element the aircraft system component carrier module is fastened via a structural holder in such a way that the aircraft system component carrier module, the aircraft system component and the aircraft structural element form an assembly group that is capable of being handled independently.

10 Claims, 8 Drawing Sheets

Related U.S. Application Data (60) Provisional application No. 61/426,579, filed on Dec. 23, 2010, provisional application No. 61/426,596, filed on Dec. 23, 2010.

(51) Int. Cl.
  *B64D 11/00* (2006.01)
  *B64F 5/10* (2017.01)

(52) U.S. Cl.
  CPC .............. *B64D 11/003* (2013.01); *B64F 5/10* (2017.01); *Y10T 29/49764* (2015.01); *Y10T 29/49826* (2015.01)

(58) Field of Classification Search
  USPC ............................. 244/119, 120, 118.1, 118.2
  See application file for complete search history.

(56) References Cited

U.S. PATENT DOCUMENTS

| | | | |
|---|---|---|---|
| 6,318,671 B1 | 11/2001 | Schumacher | |
| 6,536,710 B1 | 3/2003 | Bobzien | |
| 6,848,654 B1 * | 2/2005 | Mills | B64D 11/00 |
| | | | 105/314 |
| 8,382,034 B2 * | 2/2013 | Beentjes | B64C 1/066 |
| | | | 244/118.1 |
| 8,602,358 B2 * | 12/2013 | Pladeck | B64D 11/00 |
| | | | 244/118.1 |
| 8,702,036 B2 * | 4/2014 | Curry | B64C 1/20 |
| | | | 244/118.1 |
| 9,051,051 B1 * | 6/2015 | Biedscheid | B64D 11/00 |
| 2004/0245391 A1 * | 12/2004 | Kunzel | B64C 1/40 |
| | | | 244/119 |
| 2005/0236523 A1 | 10/2005 | Schwartz | |
| 2010/0031509 A1 * | 2/2010 | Frauen | B64F 5/10 |
| | | | 29/897.2 |
| 2010/0301167 A1 | 12/2010 | Humfeldt | |
| 2010/0301537 A1 | 12/2010 | Humfeldt | |
| 2011/0024565 A1 | 2/2011 | Koefinger | |
| 2012/0131779 A1 | 5/2012 | Umlauft | |
| 2012/0137487 A1 | 6/2012 | Umlauft | |
| 2013/0200213 A1 | 8/2013 | Umlauft | |

FOREIGN PATENT DOCUMENTS

| | | |
|---|---|---|
| DE | 10 2009 023 391 | 12/2010 |
| DE | 10 2009 023 393 | 12/2010 |
| DE | 10 2009 023 400 | 12/2010 |
| DE | 10 2009 023 401 | 12/2010 |
| DE | 10 2010 026 683 | 1/2012 |
| EP | 1 591 357 | 11/2005 |
| WO | 2008/022688 | 2/2008 |

* cited by examiner

AIRCRAFT SYSTEM COMPONENT CARRIER SYSTEM AND MOUNTING METHOD

CROSS REFERENCE TO RELATED APPLICATIONS

This application is a bypass continuation of PCT/EP2011/006443 filed Dec. 20, 2011 which is entitled to and claims the benefit of German Application No. DE 10 2010 055 962.8 filed Dec. 23, 2010, German Application No. DE 10 2010 055 995.4 filed Dec. 23, 2010, U.S. Provisional Application No. 61/426,579 filed Dec. 23, 2010, and U.S. Provisional Application No. 61/426,596 filed Dec. 23, 2010, the disclosures of each of which, including the specification, claims, drawings and abstract, are incorporated herein by reference in their entirety.

FIELD

The invention relates to an aircraft system component carrier system and to a method of mounting such an aircraft system component carrier system in an aircraft.

BACKGROUND

When mounting system components in the crown area (ceiling area) of an aircraft it is currently customary for components, such as for example electrical or electronic components, components of the aircraft air conditioning system or other aircraft systems, ceiling lining panels, lighting elements and the like, to be connected individually to the aircraft structure. As each component has to be separately positioned and fastened to the aircraft structure, mounting these components is very time-consuming. Similarly, pipes used for example as air-carrying lines of the aircraft air conditioning system or for the water supply in an aircraft cabin as well as electric lines are currently also fastened individually to the aircraft structure. This is time-consuming and leads to many interfaces between the individual components and the primary structure of the aircraft that necessitate a costly isolation of the individual components to prevent structure-borne noise. For the various individual components it is moreover necessary to provide many different holders, this complicating not only the mounting but also the stocking of spare parts. After mounting, in the course of a final inspection all of the components and lines have to be checked for proper functioning. In particular, all of the pipes have to be tested for leaks, while in the case of the electric lines all of the interfaces have to be checked. These tests are likewise relatively complicated as the lines and interfaces that are to be tested are often accessible only with difficulty in the mounted state of the lines.

For this reason attempts are being made to preassemble and test interior components that are provided for mounting in an aircraft, for example in an aircraft cabin, as far as possible outside of the aircraft. For example modules, which may comprise at least one overhead luggage compartment, at least one side lining panel as well as further components, such as for example electric lines, air-carrying lines of an aircraft air conditioning system or pipes used for the water supply in the aircraft cabin, lighting elements, personal service units and personal service channels, are to be pre-assembled and tested outside of the aircraft optionally with the aid of an assembly frame that is described in DE 10 2009 023 391. The modules are then to be transported into a final assembly position in an aircraft fuselage element by means of a transport device that is described in DE 10 2009 023 393. Finally, in the aircraft fuselage element the modules are to be connected to the aircraft structure in a manner that is as simple and time-saving as possible. For this purpose, holder systems that are described in DE 10 2009 023 400 and DE 10 2009 023 401 may be used. Finally DE 10 2010 026 683 describes an interior component carrier system for mounting an aircraft interior component module comprising a plurality of interior components on an aircraft structure.

BACKGROUND

The invention is geared to the object of providing an aircraft system component carrier system that makes it possible to simplify the mounting of an aircraft system component that is provided for disposing in the crown area of an aircraft. A further object of the invention is to indicate a time-saving and hence cost-saving method of mounting such an aircraft system component carrier system in an aircraft.

This object is achieved by an aircraft system component carrier system having features of attached claims and by a method of mounting an aircraft system component carrier system having features of attached claims.

An aircraft system component carrier system according to the invention comprises at least one aircraft system component carrier module as well as at least one aircraft system component that is fastened by means of an aircraft system component holder to the aircraft system component carrier module. The aircraft system component holder may be a holder for fastening any aircraft system component to the aircraft system component carrier module. For example the aircraft system component holder may be adapted to fasten a fluid line or a plurality of fluid lines, an electric line or a plurality of electric lines, an electronic component or a lighting element to the aircraft system component carrier module. The essential point is merely that the aircraft system component that is to be fastened by means of the aircraft system component holder to the aircraft system component carrier module is an aircraft system component that is provided for mounting in a crown area of the aircraft cabin.

The aircraft system component carrier system further comprises an aircraft structural element of a fuselage upper shell, to which element the aircraft system component carrier module is fastened by means of a structural holder in such a way that the aircraft system component carrier module, the aircraft system component and the aircraft structural element form an assembly group that is capable of being handled independently. An aircraft system component that is to be mounted in the crown area of an aircraft cabin may therefore be conveniently connected outside of the aircraft to the aircraft system component carrier module of the aircraft system component carrier system. The aircraft system component carrier module with the aircraft system component fastened thereto may moreover be fastened easily and conveniently by means of the structural holder to the aircraft structural element of the fuselage upper shell and hence, if need be, even become a part of the aircraft structure, i.e. take over support functions of the aircraft structure. As a structural holder a standard holder may be used. It is however possible to dispense with providing a holder specifically adapted to the aircraft system component that is to be mounted. The assembly group capable of being handled independently that comprises the aircraft system component carrier module, the aircraft system component and the aircraft structural element may finally be mounted in the aircraft easily in a single mounting step. For this purpose it is possible to use for example a robot arm.

The aircraft system component carrier module of the aircraft system component carrier system according to the invention may be equipped with a plurality of aircraft system component holders for fastening a plurality of aircraft system components to the aircraft system component carrier module. Furthermore, an aircraft system component holder attached to the aircraft system component carrier module may be adapted to connect a plurality of aircraft system components to the aircraft system component carrier module. The individual aircraft system components may then be attached to the aircraft system component carrier module in a convenient manner outside of the aircraft. The module with the aircraft system components fastened thereto may then be connected to the aircraft structural element in a single step by means of the structural holder of the aircraft system component carrier module. The aircraft system component carrier module or an aircraft system component provided for mounting on the module is preferably made at least partially of metal. The module and/or the aircraft system component may then fulfill a protective conductor function and is/are particularly well suited for use in an aircraft having a structure made of a fibre-reinforced composite material.

In principle the aircraft structural element may be any component of the primary structure of the aircraft. Preferably, however, the aircraft structural element is formed by a rib of the fuselage upper shell.

The aircraft system component carrier module of the aircraft system component carrier system according to the invention preferably comprises a transverse carrier element that at at least one end is connected in such a way to the aircraft structural element of the fuselage upper shell that the transverse carrier element extends substantially perpendicular to a longitudinal axis of the fuselage upper shell. The carrier element may extend over its entire length substantially parallel to a transverse axis of the fuselage upper shell. Alternatively, however, the transverse carrier element may be fashioned in such a way that, whilst extending substantially perpendicular to the longitudinal axis of the fuselage upper shell, it is however at least in sections aligned obliquely relative to the transverse axis of the fuselage upper shell. If the aircraft structural element is formed by a rib of the fuselage upper shell, the transverse carrier element is preferably connected in such a way to the frame that the frame at least in sections spans the transverse carrier element in a substantially arc-shaped manner.

The aircraft system component carrier module of the aircraft system component carrier system according to the invention preferably further comprises a carrier element that is connected in such a way to the transverse carrier element that the carrier element at least in sections spans the transverse carrier element in a substantially arc-shaped manner. If the aircraft structural element is formed by a rib of the fuselage upper shell, the shape, i.e. the curvature of the carrier element is preferably adapted to the shape, i.e. the curvature of the rib, so that the carrier element at least in sections extends substantially parallel to the rib. The carrier element may take the form of a semicircular arc. However a construction of the carrier element is alternatively conceivable, which comprises a plurality of mutually adjacent portions that are substantially straight but inclined relative to one another, so that all of the portions forming the carrier element likewise substantially describe an arc shape. The carrier element may be a carrier element, which is shaped in such a way that it extends, when the aircraft system component carrier system is mounted in an aircraft, over the entire crown area of the aircraft cabin. However the aircraft system component carrier module may alternatively comprise a plurality of carrier elements that extend, when the aircraft system component carrier system is mounted in an aircraft, over a portion of the crown area of the aircraft cabin.

The aircraft system component carrier module according to the invention may further comprise a connection element, which is connected to the carrier element and/or the transverse carrier element. Preferably the connection element connects the carrier element to the transverse carrier element. For example, when the aircraft system component carrier system is mounted in an aircraft, the connection element may extend substantially perpendicular to the longitudinal axis and substantially perpendicular to the transverse axis of the aircraft cabin. The structural holder for fastening the aircraft system component carrier module to the aircraft structural element may be fastened to the carrier element, the transverse carrier element or a connection element of the aircraft system component carrier module. Similarly, an aircraft system component holder for fastening at least one aircraft system component to the aircraft system component carrier module may be attached to the carrier module, the transverse carrier module or a connection element of the aircraft system component carrier module.

The aircraft system component carrier module of the aircraft system component carrier system according to the invention may further comprise a guide-duct delimiting element, which is connected to the carrier element, the transverse carrier element and/or a connection element and delimits a portion of a guide duct for guiding electric lines or fluid lines that extends parallel to the longitudinal axis of the fuselage upper shell. The guide-duct delimiting element therefore defines a guide duct portion that in a simple and convenient manner enables the guiding of electric lines or fluid lines along the longitudinal axis of the fuselage upper shell.

The carrier element, the transverse carrier element, the connection element and/or the guide-duct delimiting element may be configured in the form of webs or in the form of tubular elements.

The aircraft system component carrier system according to the invention preferably comprises a plurality of aircraft system component carrier modules, each of which is fastened by means of a structural holder to aircraft structural elements of the fuselage upper shell that are disposed successively along the longitudinal axis of the fuselage upper shell. If the aircraft structural elements are formed by ribs of the fuselage upper shell that are disposed successively along the longitudinal axis of the fuselage upper shell, the connecting of the ribs, the aircraft system component carrier modules and the aircraft system component attached to the aircraft system component carrier modules into an assembly group capable of being handled independently is effected for example by means of stringers that connect the ribs to one another.

In the aircraft system component carrier system according to the invention, the aircraft system component may be configured in the form of a pipe or a fastening rail that is fastened by means of corresponding aircraft system component holders to a plurality of the aircraft system component carrier modules disposed successively along the longitudinal axis of the fuselage upper shell. In other words, the aircraft system component spans a plurality of aircraft system component carrier modules which, when the aircraft system component carrier system is mounted in an aircraft, are disposed successively in the direction of the longitudinal axis of the aircraft cabin. Given such a construction of the aircraft system component carrier system, the connection of the aircraft structural elements, the aircraft system component carrier modules and the aircraft system component attached to the aircraft system component carrier modules into an assembly group capable of being handled independently may be established or assisted by the aircraft system component that spans a plurality of aircraft system component carrier modules.

An aircraft system component configured in the form of a fastening rail preferably has an Ω-shaped cross section. To an aircraft system component configured in the form of a fastening rail standard adapter plates may moreover be attached for connecting aircraft system components that are to be mounted in the crown area of an aircraft cabin.

The aircraft system component carrier system according to the invention may further comprise a part of an aircraft primary insulation that is associated with the fuselage upper shell and/or a part of an aircraft skin that is associated with the fuselage upper shell. Given such a construction of the aircraft system component carrier system, the fuselage upper shell may be preassembled extensively outside of the aircraft and be connected in only one final assembly step to the remaining elements, i.e. a bottom shell and lateral areas of a aircraft fuselage or aircraft fuselage element.

In a method according to the invention for mounting an aircraft system component carrier system in an aircraft, an aircraft system component is fastened by means of an aircraft system component holder to an aircraft system component carrier module. The aircraft system component carrier module is further connected by means of a structural holder in such a way to an aircraft structural element of a fuselage upper shell that the aircraft system component carrier module, the aircraft system component and the aircraft structural element form an assembly group that is capable of being handled independently.

The aircraft system component carrier module is preferably fastened to an aircraft structural element that is formed by a rib of the fuselage upper shell.

In a preferred embodiment of the mounting method according to the invention a plurality of aircraft system component carrier modules each are fastened by means of a structural holder to aircraft structural elements of the fuselage upper shell that are disposed successively along the longitudinal axis of the fuselage upper shell.

An aircraft system component configured in the form of a pipe or a fastening rail may be fastened by means of corresponding aircraft system component holders to a plurality of aircraft system component carrier modules disposed successively along the longitudinal axis of the fuselage upper shell.

Furthermore, in the mounting method according to the invention a part of an aircraft primary insulation that is associated with the fuselage upper shell and/or a part of an aircraft skin that is associated with the fuselage upper shell may be mounted on the aircraft structural element of the aircraft system component carrier system. Then the fuselage upper shell, which has been preassembled in this manner extensively outside of the aircraft, may be connected in only one final assembly step to the remaining elements, i.e. a bottom shell and lateral areas of an aircraft fuselage or aircraft fuselage element.

BRIEF DESCRIPTION OF DRAWINGS

There now follows a detailed description of a preferred embodiment of the invention with reference to the accompanying diagrammatic drawings, which show FIG. 1 an aircraft system component carrier module suitable for use in an aircraft system component carrier system, FIGS. 2 to 8 the mounting of an aircraft system component carrier system comprising a plurality of aircraft system component carrier module according to FIG. 1 in an aircraft, and FIG. 9 the mounting of a luggage compartment in an aircraft equipped with an aircraft system component carrier system according to FIGS. 2 to 8.

DETAILED DESCRIPTION

Figure 1:
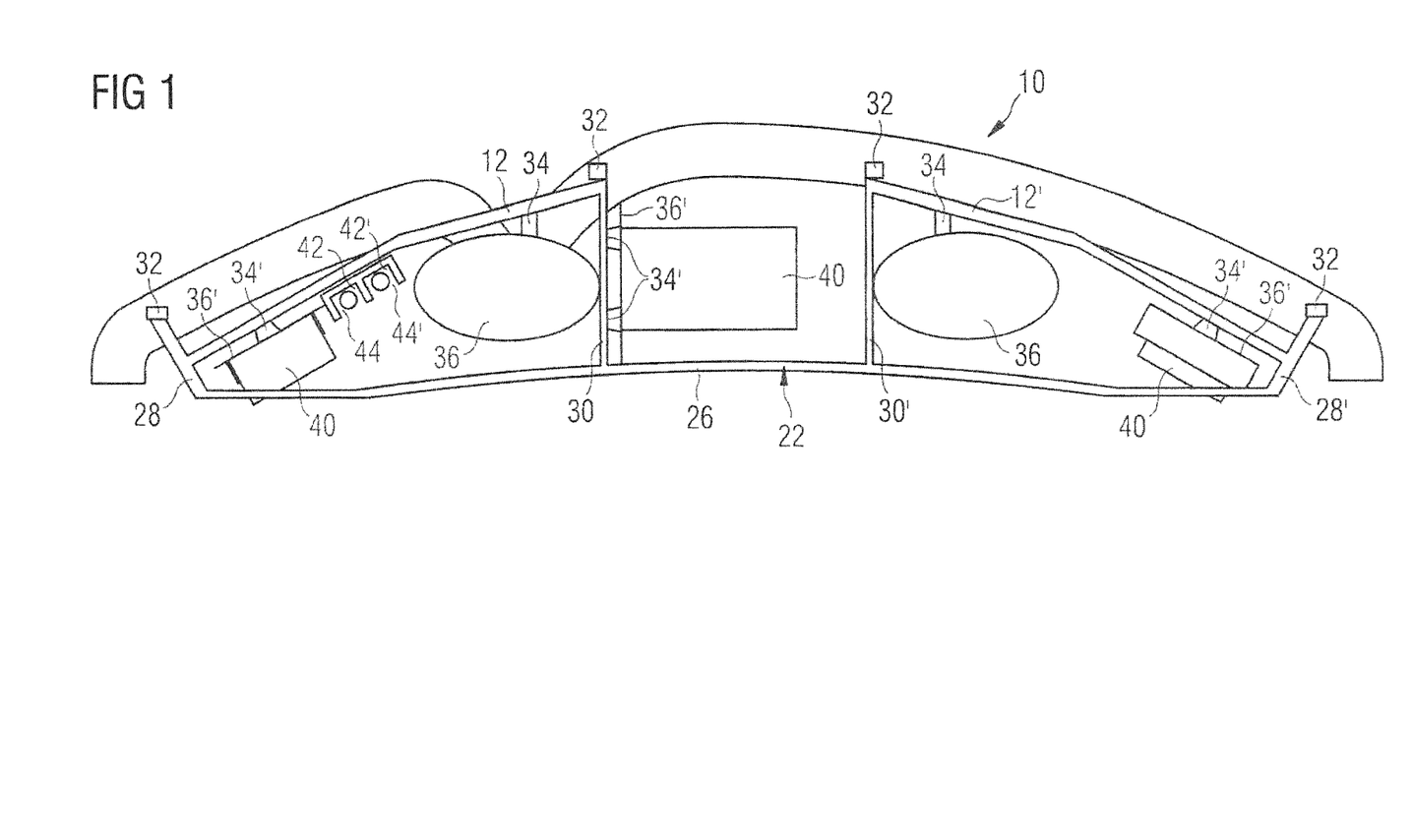

An aircraft system component carrier module 10 represented in FIG. 1 comprises a first arc-shaped carrier element 12. The aircraft system component carrier module 10 further comprises a second arc-shaped carrier element 12'. A first end of a transverse carrier element 22 is connected to a first end of the first carrier element 12. A second end of the transverse carrier element 22, on the other hand, is connected to a first end of the second carrier element 12'. The transverse carrier element 22 comprises a central portion 26 which, when the aircraft system component carrier module 10 is mounted in an aircraft, extends substantially perpendicular to a longitudinal axis of an aircraft cabin 20 and substantially parallel to a transverse axis of the aircraft cabin 20. The transverse carrier element 22 in the region of its ends connected to the first and the second carrier element 12, 12' however comprises end portions 28, 28' that are inclined at an angle of ca. 120° relative to the central portion 26.

A further end of the first carrier element 12 is connected by a first connection element 30 to the central portion 26 of the transverse carrier element 22. In a similar fashion a further end of the second carrier element 12' is connected by a second connection element 30' to the central portion 26 of the transverse carrier element 22. In the embodiment of an aircraft system component carrier module shown in FIG. 1, the connection elements 30, 30' extend substantially perpendicular to the longitudinal axis and at right angles to the transverse axis of the aircraft cabin 20. It is self-evident that the connection elements 30, 30' may however have a different alignment in particular relative to the transverse axis of the aircraft cabin 20.

The embodiment of an aircraft system component carrier module 10 that is represented in FIG. 1 further comprises four structural holders 32, which are connected in the region of the ends of the carrier elements 12, 12' to the aircraft system component carrier module 10. The structural holders 32 are used to fasten the aircraft system component carrier module 10 to an aircraft structural element 14 that is configured in the form of a rib. The structural holders 32 are standard holders, which merely have to be adapted to the construction of the aircraft system component carrier module 10 but do not have to be customized for the fastening of an aircraft system component to the aircraft structural element 14.

Rather, the mounting of various aircraft system components, which are to be mounted in the crown area of the aircraft cabin 20, in their final assembly position is effected with the aid of the aircraft system component carrier module 10. For this purpose, the aircraft system component carrier module 10 comprises two first aircraft system component holders 34, which are used to fasten two first aircraft system components 36 configured in the form of a pipe to the aircraft system component carrier module 10. Three second aircraft system component holders 34' are used to fasten a second aircraft system component 36' configured in the form of a fastening rail to the aircraft system component carrier module 10.

The fastening rail forming the second aircraft system component 36' has an Ω-shaped cross section and carries standard adapter plates, to which further aircraft system components 40 configured for example in the form of electronic boxes may be fastened. When the aircraft system component carrier module 10 is mounted in an aircraft, the second aircraft system components 36' each being configured in the form of a fastening rail as well as the first aircraft system components 36 configured in the form of pipes extend substantially parallel to the longitudinal axis of the aircraft cabin 20.

Finally, the aircraft system component carrier module 10 is provided with two guide-duct delimiting elements 42, 42'. The guide-duct delimiting elements 42, 42' each define a guide duct 44, 44' for guiding electric lines or fluid lines through the crown area of the aircraft cabin 20. When the aircraft system component carrier module 10 is mounted in an aircraft, the guide ducts 44, 44' extend substantially parallel to the longitudinal axis of the aircraft cabin 20.

As may be seen in FIGS. 2 to 8, a plurality of aircraft system component carrier modules 10 may be used to form an aircraft system component carrier system 54. When the aircraft system component carrier system 54 is mounted in an aircraft, the individual aircraft system component carrier modules 10 are disposed successively in the direction of the longitudinal axis of a fuselage upper shell 55 and/or in the direction of the longitudinal axis of the aircraft cabin 20. As may best be seen in FIG. 6, the spacing between two mutually adjacent aircraft system component carrier modules 10 of the aircraft system component carrier system 54 corresponds to the spacing between two mutually adjacent ribs of the fuselage upper shell 55 that form an aircraft structural element 14. Consequently, each aircraft system component carrier module 10 of the aircraft system component carrier system 54 may be fastened to a rib of the fuselage upper shell 55. When the aircraft system component carrier module 10 is fitted in the aircraft system component carrier system 54, the first and the second carrier element 12, 12' of the aircraft system component carrier module 10 extend substantially parallel to a rib of the fuselage upper shell (see FIG. 6).

An aircraft system component carrier system 54 that comprises a plurality of aircraft system component carrier modules 10 disposed successively in the direction of the longitudinal axis of the fuselage upper shell 55 and/or in the direction of the longitudinal axis of the aircraft cabin 20 is particularly well suited for mounting aircraft system components in the crown area of the aircraft cabin 20 that extend over a greater distance along the longitudinal axis of the fuselage upper shell 55 and/or in the direction of the longitudinal axis of the aircraft cabin 20, i.e. over a length comprising a plurality of rib compartments. The aircraft system component carrier system 54 is therefore particularly well suited for mounting the first aircraft system components 36 configured in the form of pipes and the second aircraft system components 36' configured in the form of Ω-shaped fastening rails in the crown area 18 of the aircraft cabin 20 because these components 36, 36' may be fastened by corresponding aircraft system component holders 34, 34' of a plurality of successively disposed aircraft system component carrier modules 10 to a plurality of aircraft system component carrier modules 10.

Figures 2, 3:
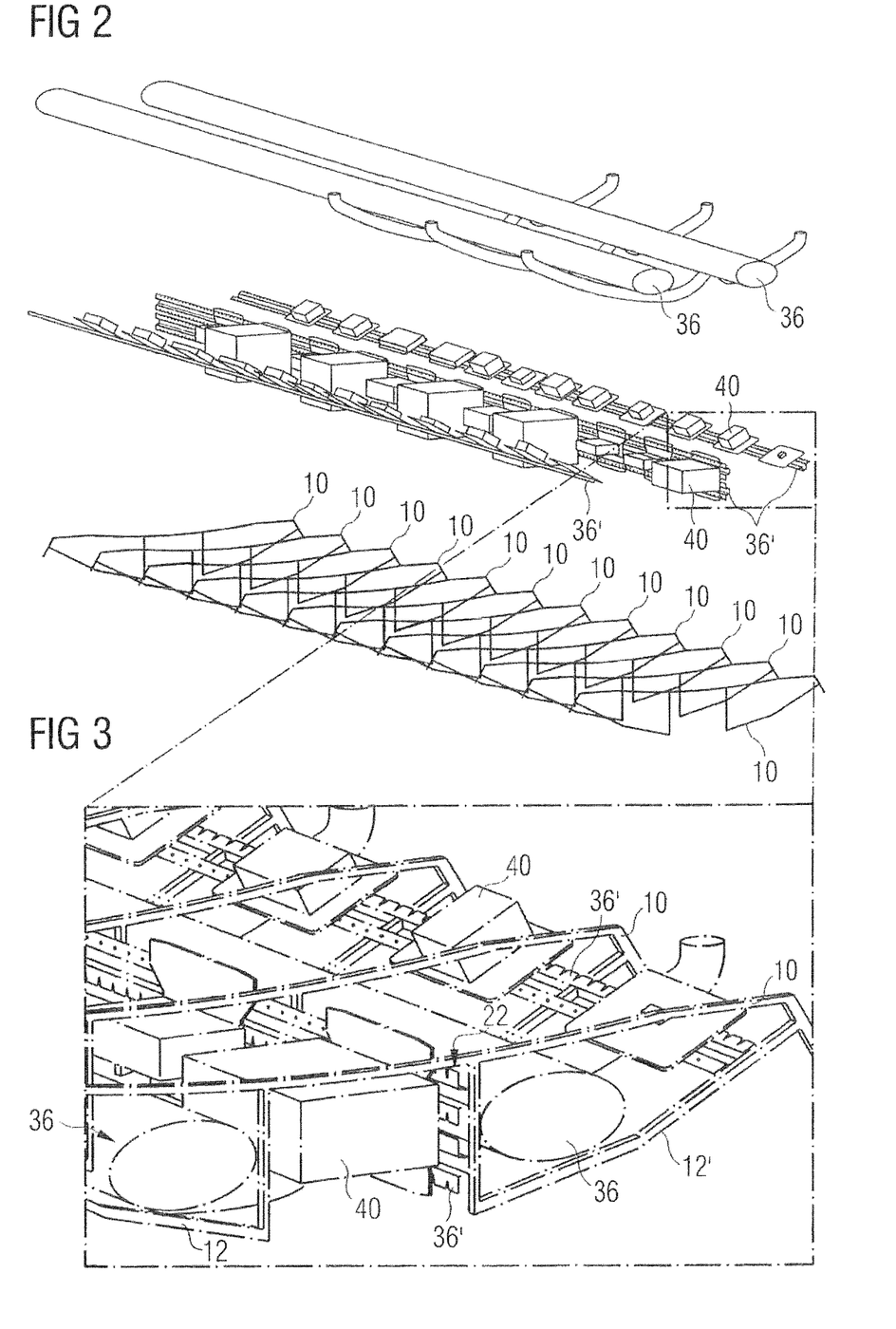
Figure 4:
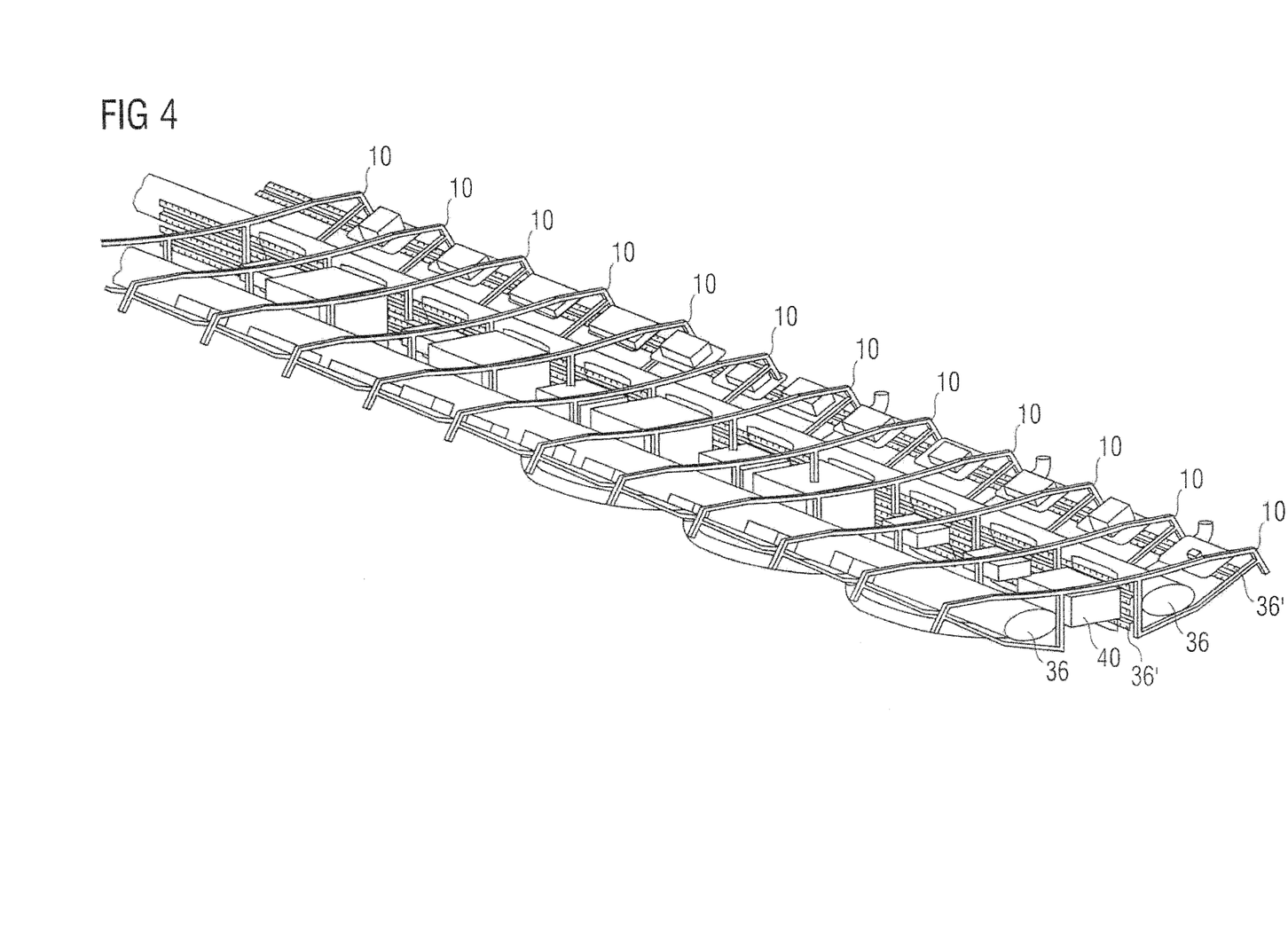

As may be seen in FIGS. 2 to 4, during the mounting of the aircraft system component carrier system 54 in an aircraft first the aircraft system components 36, 36' are fastened by means of the aircraft system component holders 34, 34' to the aircraft system component carrier modules 10 of the aircraft system component carrier system 54. As the first aircraft system components 36 configured in the form of pipes and the second aircraft system components 36' configured in the form of Ω-shaped fastening rails are fastened to a plurality of successively disposed aircraft system component carrier modules 10, a connection between the successively disposed aircraft system component carrier modules 10 is established by means of the components 36, 36'. The successively disposed aircraft system component carrier modules 10 with the aircraft system components 36, 36' fastened thereto therefore already form an assembly group that is capable of being handled independently and has no need for additional connection elements for connecting the successively disposed aircraft system component carrier modules 10.

Figure 5:
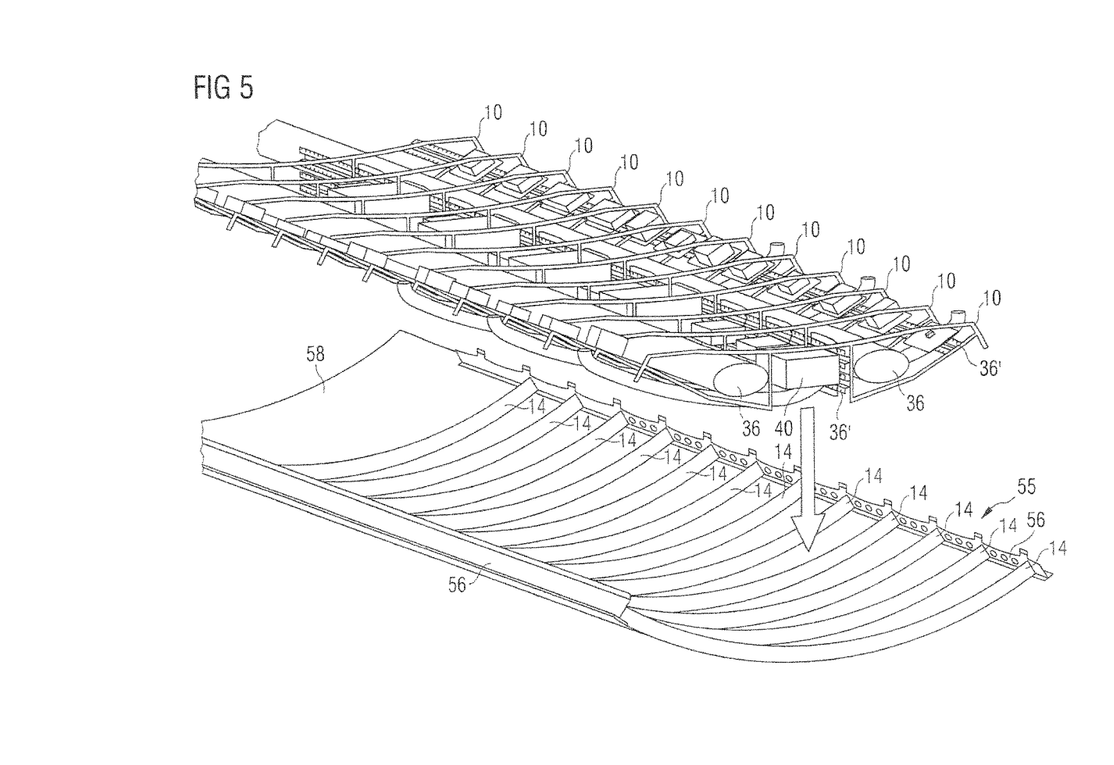

The aircraft system component carrier modules 10 with the aircraft system components 36, 36' fastened thereto are then attached by means of the structural holders 32 to the ribs of the fuselage upper shell 55 that form corresponding aircraft structural elements 14 (see FIG. 5). In this case, each aircraft system component carrier module 10 is associated with an aircraft structural element 14 formed by a rib of the fuselage upper shell 55. In FIG. 5 the ribs of the fuselage upper shell 55 are connected to one another by stringers 56, which extend along the longitudinal axis of the fuselage upper shell 55. The fuselage upper shell 55 moreover already comprises an aircraft skin 58, which is connected to the ribs, as well as a primary insulation, which for the sake of greater clarity is not represented in FIG. 5. The fuselage upper shell 55 may however alternatively be defined merely by the ribs disposed successively along the longitudinal axis of the fuselage upper shell 55.

During the mounting of the aircraft system component carrier modules 10 with the aircraft system components 36, 36' fastened thereto, the fuselage upper shell 55 is supported in such a way that a surface of the ribs that, when the fuselage upper shell 55 is mounted in an aircraft, faces a floor of the aircraft cabin, i.e. forms an underside of the ribs, is remote from a bearing surface of the fuselage upper shell 55, i.e. is directed upwards in an easily accessible manner. In other words, compared to its orientation when mounted in an aircraft, the fuselage upper shell 55 during the mounting of the aircraft system component carrier modules 10 is rotated through 180°. This enables a convenient and secure support of the fuselage upper shell 55 and easy mounting of the aircraft system component carrier modules 10.

Figure 6:
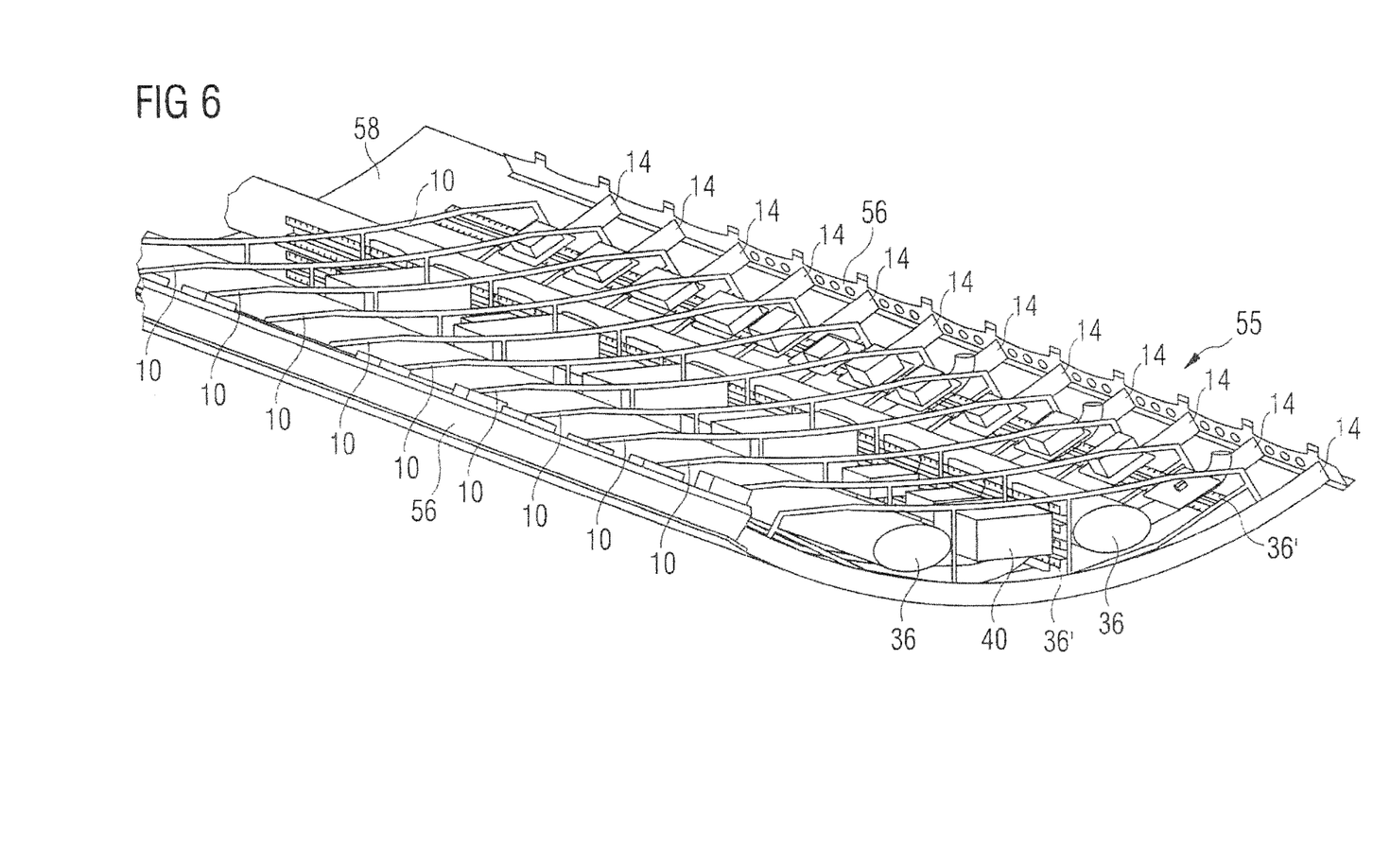
Figure 7:
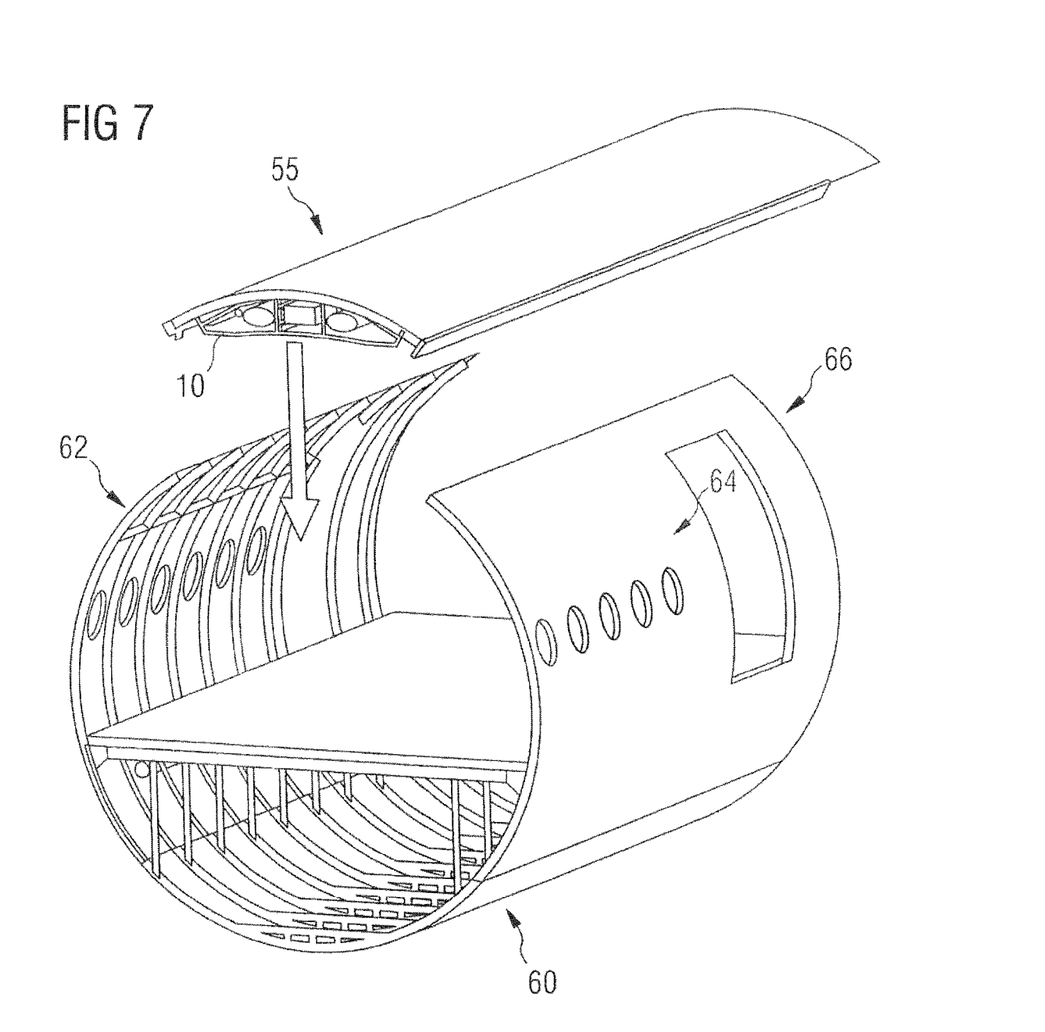
Figure 8:
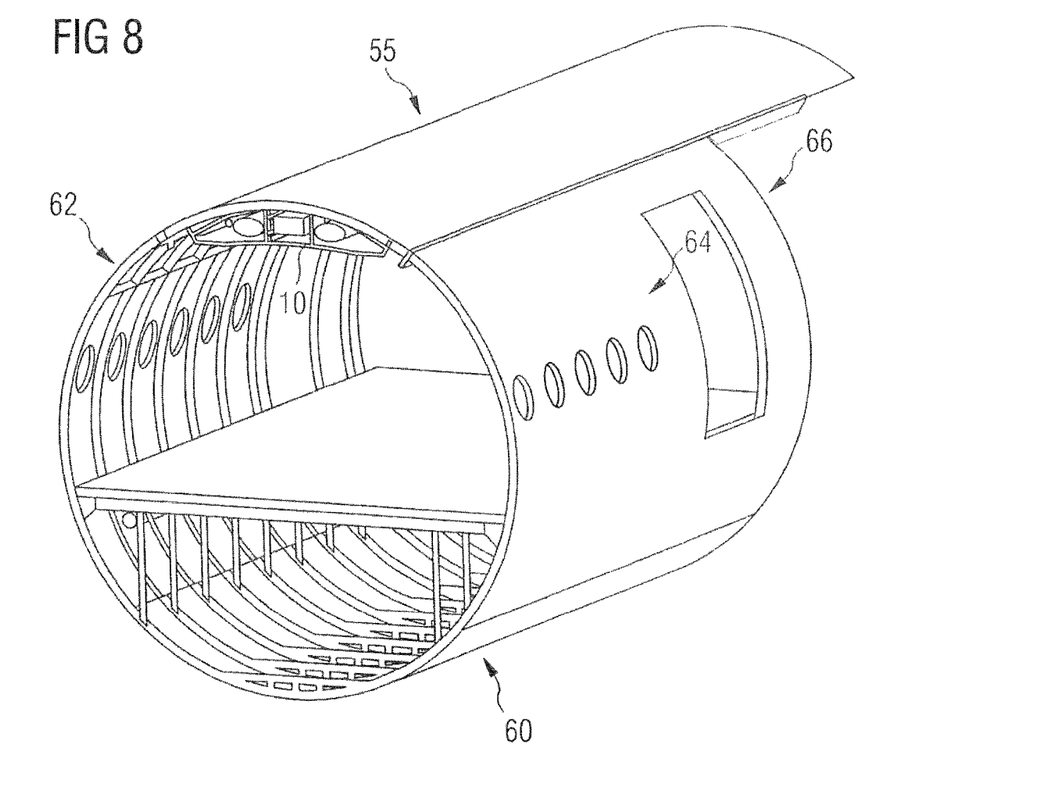
Figure 9:
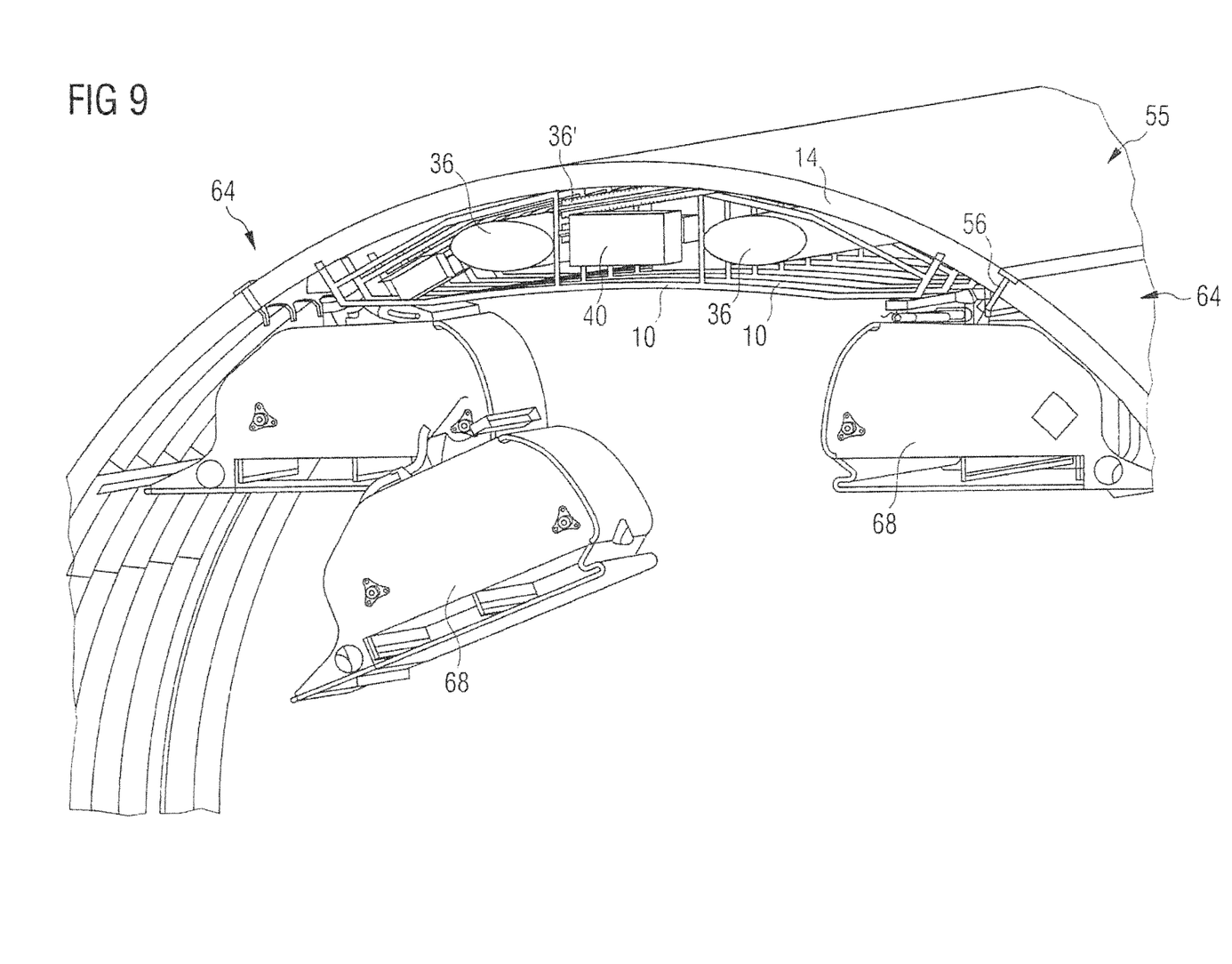

As is evident from FIGS. 6 to 8, the fuselage upper shell 55, the aircraft system component carrier modules 10 and the aircraft system components 36, 36' fastened to the aircraft system component carrier modules 10 form an assembly group that is capable of being handled independently. This assembly group may be connected, for example by means of a robot arm, in a final assembly step to the remaining elements, i.e. a bottom shell 60 and lateral areas 62, 64 of an aircraft fuselage element 66 (see FIGS. 7 and 8). In this case, the assembly group is rotated through 180°. Finally, as shown in FIG. 9, luggage compartments 68 may be installed.

The invention claimed is:
1. An aircraft system component carrier system comprising:
   a plurality of aircraft system component carrier modules, at least one aircraft system component, which is fastened by aircraft system component holders to the plurality of the aircraft system component carrier modules, and a plurality of aircraft structural elements of a fuselage upper shell that are disposed successively along the longitudinal axis of the fuselage upper shell, wherein each of the aircraft structural elements is formed by a rib of the fuselage upper shell, wherein each of the plurality of aircraft system component carrier modules is fastened by a structural holder to one of the aircraft structural elements of the fuselage upper shell, wherein the aircraft structural elements of the fuselage upper shell are connected to one another by stringers extending along a longitudinal axial of the fuselage upper shell, wherein the aircraft system component carrier modules, the aircraft system components, the stringers and the aircraft structural elements form a pre-assembled assembly group, and wherein the pre-assembled assembly group is configured to be connected to a bottom shell and lateral areas of an aircraft fuselage, when assembling the aircraft, wherein the pre-assembled assembly group is configured to be handled independently from the bottom shell and lateral areas of the aircraft fuselage prior to its connection to the bottom shell and lateral areas of the aircraft fuselage.

2. The aircraft system component carrier system according to claim 1, wherein the aircraft system component carrier module comprises a transverse carrier element, which at least one end is connected in such a way to the aircraft structural element of the fuselage upper shell that a transverse carrier element extends substantially perpendicular to a longitudinal axis of the fuselage upper shell.

3. The aircraft system component carrier system according to claim 2, wherein the aircraft system component carrier module further comprises a second carrier element, which is connected in such a way to the transverse carrier element that the second carrier element at least in sections spans the transverse carrier element in a substantially arc-shaped manner.

4. The aircraft system component carrier system according to claim 3, wherein the aircraft system component carrier module further comprises a connection element, which is connected to the second carrier element and/or the transverse carrier element.

5. The aircraft system component carrier system according to claim 1, wherein the aircraft system component carrier module further comprises a guide-duct delimiting element, which delimits a portion of a guide duct for guiding electric lines or fluid lines that extends parallel to the longitudinal axis of the fuselage upper shell.

6. The aircraft system component carrier system according to claim 1, wherein the aircraft system component is configured in the form of a pipe or a fastening rail that is fastened by corresponding aircraft system component holders to a plurality of the aircraft system component carrier modules disposed successively along the longitudinal axis of the fuselage upper shell.

7. The aircraft system component carrier system according to claim 1, wherein the aircraft system component carrier system further comprises a part of an aircraft primary insulation that is associated with at least one of the fuselage upper shell and a part of an aircraft skin that is associated with the fuselage upper shell.

8. A method of mounting an aircraft system component carrier system in an aircraft, comprising the steps:
fastening an aircraft system component to a plurality of aircraft system component carrier modules by aircraft system component holders, and
fastening the aircraft system component carrier modules to a plurality of aircraft structural elements of a fuselage upper shell by structural holders, wherein the plurality of aircraft structural elements of the fuselage upper shell are disposed successively along a longitudinal axis of the fuselage upper shell, wherein the aircraft structural elements of the fuselage upper shell are connected to one another by stringers extending along the longitudinal axial of the fuselage upper shell, wherein each of plurality of aircraft structural elements is formed by a rib of the fuselage upper shell, wherein the aircraft system component carrier modules, the aircraft system components and the aircraft structural elements form a pre-assembled assembly group,
connecting the pre-assembled assembly group to a bottom shell and lateral areas of an aircraft fuselage when assembling the aircraft, wherein the pre-assembled assembly group is configured to be handled independently from the bottom shell and lateral areas of the aircraft fuselage prior to its connection to the bottom shell and lateral areas of the aircraft fuselage.

9. The method according to claim 8, wherein an aircraft system component configured in the form of a pipe or a fastening rail is fastened by corresponding aircraft system component holders to a plurality of the aircraft system component carrier modules disposed successively along the longitudinal axis of the fuselage upper shell.

10. The method according to claim 8, wherein a part of an aircraft primary insulation that is associated with at least one of the fuselage upper shell and a part of an aircraft skin that is associated with the fuselage upper shell is further mounted on the aircraft structural element of the aircraft system component carrier system.

* * * * *